(12) United States Patent
DeJong

(10) Patent No.: US 7,613,373 B1
(45) Date of Patent: Nov. 3, 2009

(54) SUBSTRATE GUIDED RELAY WITH HOMOGENIZING INPUT RELAY

(75) Inventor: Christian Dean DeJong, Sammamish, WA (US)

(73) Assignee: Microvision, Inc., Redmond, WA (US)

(*) Notice: Subject to any disclaimer, the term of this patent is extended or adjusted under 35 U.S.C. 154(b) by 0 days.

(21) Appl. No.: 12/167,882

(22) Filed: Jul. 3, 2008

(51) Int. Cl.
  *G02B 6/32* (2006.01)
  *G02B 6/26* (2006.01)
  *G02B 6/42* (2006.01)

(52) U.S. Cl. ............................. 385/33; 385/31; 385/39; 359/629; 359/636

(58) Field of Classification Search ................ 385/31, 385/33, 39; 359/618, 629, 630, 633, 636, 359/850
See application file for complete search history.

(56) References Cited

U.S. PATENT DOCUMENTS

| | | | |
|---|---|---|---|
| 6,829,095 B2 | 12/2004 | Amitai | |
| 7,021,777 B2 | 4/2006 | Amitai | |
| 7,418,170 B2* | 8/2008 | Mukawa et al. | 385/31 |
| 7,570,859 B1* | 8/2009 | DeJong | 385/133 |
| 2005/0180687 A1* | 8/2005 | Amitai | 385/31 |
| 2006/0228073 A1 | 10/2006 | Mukawa et al. | |
| 2006/0274296 A1* | 12/2006 | Tolbert et al. | 355/67 |
| 2007/0159673 A1 | 7/2007 | Freeman et al. | |
| 2007/0171328 A1* | 7/2007 | Freeman et al. | 349/65 |
| 2008/0025667 A1 | 1/2008 | Amitai | |
| 2009/0015929 A1* | 1/2009 | DeJong et al. | 359/633 |

FOREIGN PATENT DOCUMENTS

| | | |
|---|---|---|
| WO | WO-2006/085308 | 8/2006 |
| WO | WO-2007/054928 | 5/2007 |
| WO | WO-2008/023367 | 2/2008 |

* cited by examiner

*Primary Examiner*—Daniel Petkovsek
(74) *Attorney, Agent, or Firm*—Kevin D. Wills

(57) ABSTRACT

An optical relay system (200) includes a scanned light source (206) and a substrate guided relay (204). The substrate guided relay (204) includes an input coupler (201), an output coupler (203), and an optical substrate (202) disposed therebetween. A light homogenizing relay device (208) is disposed between the scanned light source (206) and the substrate guided relay (204). The light homogenizing relay device (208) is configured to receive a light beam (207) from the scanned light source (206). The light homogenizing relay device (208) makes at least one copy (209) of the light beam (207), and delivers the light beam (207) and the at least one copy (209) to a light receiving surface (210) of the input coupler (201), thereby effectively creating a larger input beam while retaining the angular spread of the initial light beam (207).

9 Claims, 7 Drawing Sheets

SUBSTRATE GUIDED RELAY WITH HOMOGENIZING INPUT RELAY

BACKGROUND

1. Technical Field

This invention relates generally to optical relay systems, and more particularly to an optical relay system that includes a substrate guided relay and scanned light source, and which employs a homogenizing input relay device to make copies of an input light beam to provide a more uniform image output.

2. Background Art

Substrate guided relays are devices that transmit light rays from a source to a viewer. Generally, substrate guided relays are optical image transfer devices that include a substrate, which may manufactured from glass or fused silica, and which directs light from a relay input to a relay output. This light can be guided along its path by the optical transfer properties of the substrate. These optical transfer properties can additionally work in tandem with reflective or diffractive devices coupled to the substrate. The surfaces of the substrate can also work to direct the light to its intended destination. In many applications, this end destination is a viewing region that is directed to a projection surface or a user's eye. One application of substrate guided relays is that of a near-to-eye display in which the viewing region projects directly into the pupil of a user.

Substrate guided relays generally include three basic components: an input that collects and receives light from a source, a substrate that transfers the light, and an output that delivers light away from the substrate. In many applications, it is advantageous to keep the various components of the substrate guided relay assembly small, as they are sometimes used as head mounted displays or other compact display systems. This desire to keep size to a minimum creates challenges, however, for the designer. In particular, when a source of light is small, the light often has a smaller spatial extent. It can therefore be challenging for a substrate guided relay designer to create a display having a pupil that is much larger than the extent of the source.

An additional challenge is that it can be advantageous to confine the incident light coming from the source within the substrate guided relay before the beam expands. Such confinement helps to ensure that all of the light projected by a source is captured by the substrate guided relay, rather than being lost to the surrounding environment.

Further, from a fabrication standpoint, it can be challenging to fabricate an input device or substrate of small dimensions with a high degree of precision generally associated with image guiding substrates. Extra thickness or stabilization devices may be required for rigidity, stability, to maintain flatness over a large area when such an input device is heated, cooled, or coated, in the manufacturing process.

The desire to use small light sources and the challenges of manufacturing small input devices can result in an input light beam that is smaller that the input to the substrate guided relay in at least one dimension. Sometimes, this mismatched beam to input ratio can cause dark regions or gaps in the output image where little or no light is present.

There is thus a need for an improved optical relay system capable of enhancing output brightness and uniformity, yet that is compatible with compact, scanned light sources.

Figure 1:
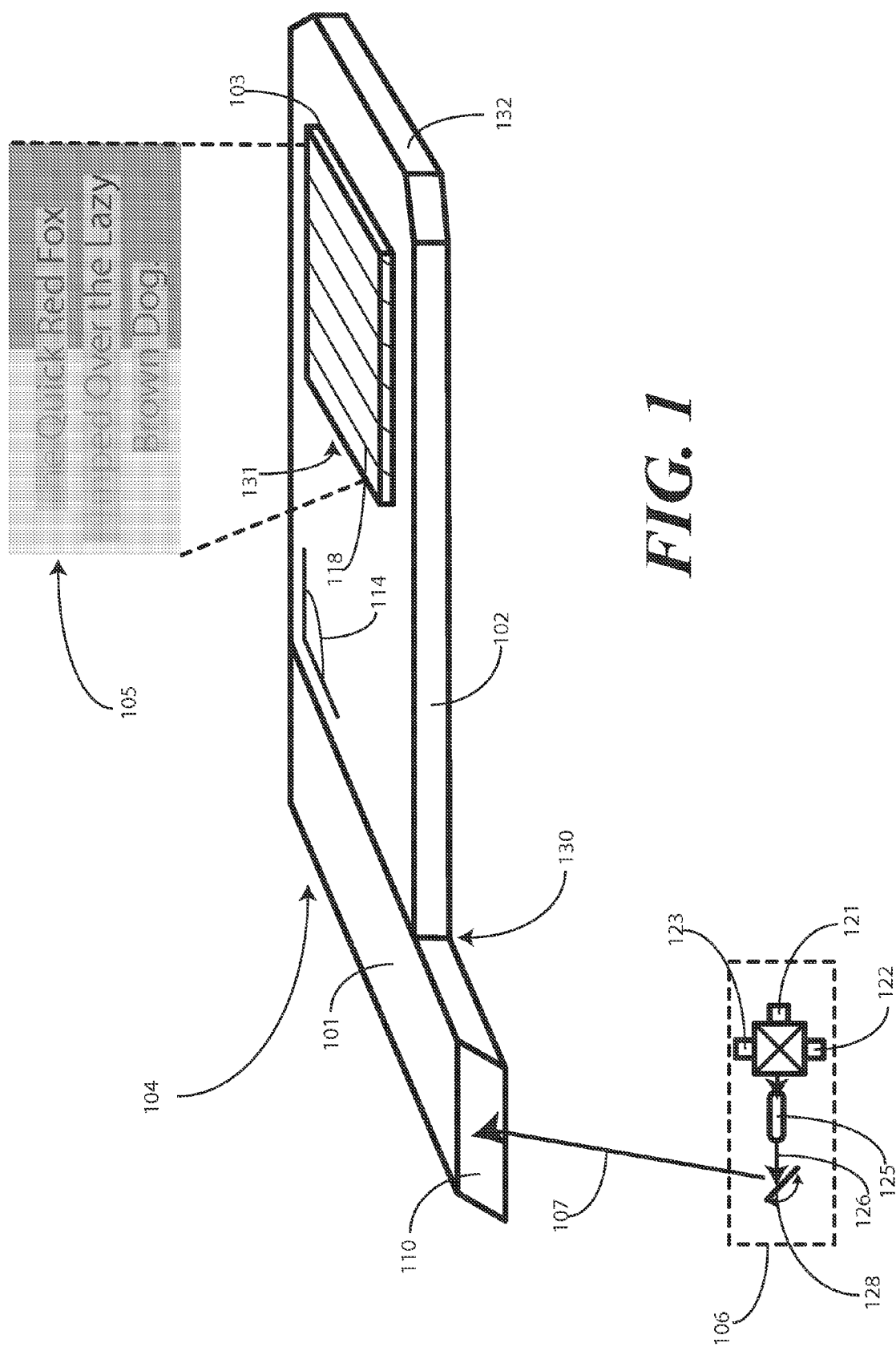
FIG. 1 illustrates one embodiment of an optical relay system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention include an optical relay system employing a light source. One example of a suitable light source is a Microelectromechanical System (MEMS) light source that delivers light to a substrate guided relay. Note that while a substrate guided relay receiving light from a MEMS source will be used herein as an exemplary embodiment, it will be clear to those of ordinary skill in the art having the benefit of this disclosure that embodiments of the invention are not so limited. Other light sources—in addition to MEMS sources—can also be used, including liquid crystal display light sources, liquid crystal on silicon light sources, digital light processing light sources, organic light emitting diode light sources, and so forth, with the homogenizing devices described herein to expand the exit pupil of the overall system. Further, embodiments of the invention are suitable for use with a wide range of substrate guided relays in addition to those described herein. For example, the homogenization devices described herein can be used with substrate guided relays such as those set forth in International Published Application WO/2006/085308 to Amitai entitled "Substrate guided optical device utilizing polarizing beam splitters."

To help prevent or eliminate dark regions or gaps that may occur when the output of the scanned light source is smaller than a light receiving surface of the input coupler of the substrate guided relay, embodiments of the invention include a light homogenizing relay device. In one embodiment, the light homogenizing relay device is disposed between the scanned light source and the substrate guided relay. The light homogenizing relay device makes at least one copy of the light beam projected by the scanned light source, and delivers both the light beam and the copy or copies to the substrate guided relay.

In one embodiment, the light homogenizing relay device delivers the light beam and the copy or copies to the light receiving surface of the input coupler of the substrate guided relay. In another embodiment, the light homogenizing relay device delivers light to another homogenizing device coupled to the input coupler. The copy or copies of the light beam effectively create a larger input beam while retaining the angular spread of the light beam. Hence, the field of view remains constant. The input light beam is copied rather than spread.

The light homogenizing relay device can take many forms. For example, in one embodiment, the light homogenizing relay device comprises a pupil expander, such as a multi-lens relay. In another embodiment, the light homogenizing relay device comprises flat, partially reflective plates. In another embodiment, the light homogenizing relay device comprises birefringent crystals. In yet another embodiment, the light homogenizing relay device comprises prisms. In another embodiment, the light homogenizing relay device comprises diffractive elements. Each of these may be used separately or in combination.

While in some embodiments only one copy of the light beam is made, in other embodiments more than one copy of the light beam projected by the scanned light source can be made. For instance, in one embodiment a replicating prism can be used as the light homogenizing relay device. Such a replicating prism can create between two and five copies of the incoming beam.

Additionally, the copies of the light beam projected by the light source can be delivered to the substrate guided relay in a variety of ways. For instance, in one embodiment the copies are delivered on-axis with the original light beam such that the copies are substantially parallel with the original light beam. In another embodiment, the light homogenizing relay device can be positioned so as to slightly bias the light beam and the copies to compliment the optical properties of the substrate guided relay. By way of example, the light homogenizing relay device may be positioned such that the light beam and copies are biased somewhere between plus or minus 20 degrees from the initial path.

Turning now to FIG. 1, illustrated therein is one embodiment of a substrate guided relay 104 having an input coupler 101, an optical substrate 102, and an output coupler 103. In the embodiment of FIG. 1, the input coupler 101 is coupled to the optical substrate 102 at an angle 114. Said differently, in one embodiment the input coupler 101 is coupled to the optical substrate 102 in an orientation such that the optical axis of the input coupler 101 intersects the optical axis of the optical substrate 102 at a non-orthogonal angle. This angle 114 affects how light leaves the input coupler 101 and enters the optical substrate 102. While this angle 114 can be orthogonal, and while various angles can work for angle 114, in one embodiment angle 114 is between 30 and 60 degrees. Experimental testing has shown that an angle of 45 degrees is effective for many applications. Embodiments and operating characteristics of such substrate guided relays are described in commonly assigned, copending U.S. patent application Ser. No. 11/775,511, filed Jul. 10, 2007, entitled "Substrate-Guided Relays for Use with Scanned Beam Light Sources," which is incorporated herein by reference.

The input coupler 101 collects and receives light. This light can be collected from a light source 106. In one embodiment, the light source 106 comprises a scanned beam display engine, such as a MEMS scanned light source. The scanned beam display engine is configured to provide an adjustable or variable accommodation scanned beam 107 into the input coupler 101 of the substrate guided relay 104.

The illustrative light source 106 of FIG. 1 employs three light sources 121,122,123. A beam combiner 124 combines the output of light sources 121,122,123 to produce a combined modulated beam 125. A variable collimation or variable focusing optical element 126 produces a variably shaped beam that is scanned by the scanning mirror 128 as variably shaped scanned light beam 107, which is launched into input coupler 101 of the substrate guided relay 104.

In one embodiment, the light source 106 comprises a MEMS display engine that employs a MEMS scanning mirror 128 to deliver light from the light sources 121,122,123 to the light receiving surface 110 of the input coupler 101. MEMS scanning display engines suitable for use with embodiments of the present invention are set forth in US Pub. Pat. Appln. No. 2007/0159673, entitled, "Substrate-guided Display with Improved Image Quality"; which is incorporated by reference herein.

Scanned light sources, such as the MEMS scanning display engine, work well with embodiments of the present invention due to their small, compact size. Further, such a scanned source has other beneficial features, including the fact that all three colors are scanned at the same time, thereby reducing blur occurring due to source movement. It will be clear to one of ordinary skill in the art having the benefit of this disclosure, however, that embodiments of the present invention are not so limited. Other light sources can also be used, including liquid crystal display sources, light emitting diode sources, the other light sources mentioned, supra, and so forth.

Once the input coupler 101 receives the light beam 107, the light is delivered from the input coupler 101 to the optical substrate 102 through a first interface 130. The input coupler 101 can be coupled to the optical substrate 102 along the first interface 130 in a variety of ways, including adhesives, glues, and epoxies. In one exemplary embodiment, the input coupler 101 is coupled to the optical substrate 102 through optical contacting. Where an optical contacting process is used, this bond can be enhanced by chemically treating the surfaces prior to contacting.

In one embodiment, the first interface 130 includes a partially reflective coating. While various applications and desired performance attributes can work to determine what kind of partially reflective coating is used, in one embodiment the first interface 130 includes a metallic coating, such as silver. Such a coating can be used to vary reflectance along this first interface 130. For instance, such a coating can have a high reflectance near the input, and a lower reflectance further from the input. This varied reflectance effect can be achieved with a variable thickness coating that includes a metal layer.

As an aside concerning the partially reflective coatings described herein, in substrate guided relay systems, light interactions with partially reflective coatings often happen at or near Brewster's angle. In Brewster's angle interactions, the p-polarization component reflection is often zero for common layered reflective materials. (This angle can occur in roughly a thirty to fifty degree range.) When making partially reflective coatings, it is common practice to select at least two materials and layer them together: a high refractive index material and a low refractive index material placed in layers upon a substrate guided relay surface to obtain the desired reflectance. Multiple layers can be used, but materials having a large difference in refractive index generally require fewer layers to achieve a given reflectance.

At Brewster's angle, the reflectance for a material pair is essentially zero. At near Brewster's angles, the reflectance is generally low. However, the reflectance changes rapidly with angle and wavelength. As a result, normally effective coating material pairs can become poor choices for a partially reflective coating. When the angles of interest (in the design of the substrate guided relay) for high/low index pairs cover Brewster's angle, manufacturing material pairs having significant reflectance (>20%) for p-polarized light over a range of angles and wavelengths is difficult. Further, creating p-polarization partially reflective coatings that are non-absorbing and have flat wavelength responses is also difficult. Generally speaking a large number of reflective material layers are required.

The partially reflective coatings that will be descried herein—such as the partially reflective coating that can be used at the first interface 130—are generally known to those of ordinary skill in the art. Such coatings can be used to reflect some components of incident light and transmit others. Further, such coatings can be used transmit or reflect certain levels of light depending on polarization. These coatings can be metallic layers—such as thin layers of silver. Alternatively, they may be multi-layer structures deposited by a vapor deposition process or other suitable manufacturing process.

Some certain coatings can be configured to preferentially reflect incident rays across a particular range of angles. For example, several monolithic layers of partially reflecting material can be configured to exhibit a polarization preference, and angle preference, or a combination thereof. Alternatively, separate angle preferential and polarization preferential partial reflective layers may be used, with each layer contributing a portion of the reflected energy.

As used herein, an s-polarization partially reflective coating includes coatings that have an s-polarization reflectance within a thirty to seventy percent range (some occurring near fifty percent), and a lower (generally less than ten percent or so) reflectance p-polarization reflectance for angles and wavelengths of interest. A p-polarization partially reflective coating includes coatings that reflect both p-polarized light and s-polarized light, and exhibit reflectance of p-polarized light at a wavelength and angle of interest greater than 20% operating in the vicinity of Brewster's angle (for a low index material with an index ~1.5 and a high index material with refractive index of 1.7-2.1, the angle is ~50 degrees when going from high index to low index, and 30 degrees when going from low index to high index). A partially reflective coating used for applications well away from Brewster's angle would generally be an s-polarization partially reflective coating as no special design considerations are made to obtain a significant (>20%) p-polarization reflectance.

Once light is delivered from the input coupler 101 to the optical substrate 102 through the first interface 130, the light passes along the optical substrate 102 to the output coupler 103. In one embodiment of the present invention, the optical substrate 102 comprises a single or multi-layer optical substrate that is about two to five millimeters thick. In one embodiment, the length of the overall optical substrate 102 is generally between thirty and one hundred millimeters. The distal end 132 of the optical substrate 102 can be squared, semi-hexagonal, rounded, or may take other shapes. Additionally, the top and bottom edges of the optical substrate 102 can take on a variety of shapes or geometrical configurations. For instance, the portion of the optical substrate 102 used to transmit the image can be a trapezoid in cross section that encloses the contact points between the input coupler 101 and the optical substrate 102, and the most distal corners of the input coupler 101.

In some embodiments, light passing along the optical substrate 102 is confined within the optical substrate 102 by the principles of total internal inflection. When the light reflects off an edge of the optical substrate 102, it is generally reflected at an equal and opposite angle to the angle of incidence and continues propagating along the optical substrate 102.

Once light as passed sufficiently along the optical substrate 102, distally from the input coupler 101, the light reaches the output coupler 103. The output coupler 103 is configured to receive light from the optical substrate 102 and to enable a viewer (not shown) to see a displayed image 105, whether it be projected on a projection surface or directly into the viewer's eye. In one embodiment, the output coupler 103 directs light to the viewer through a plurality of partially reflective layers 118. Note that the output coupler 103 may be disposed either on top of, or beneath, the optical substrate 102.

As with the input coupler 101, the output coupler 103 can be coupled to the optical substrate 102 in a variety of ways, including adhesives, glues, or via optical contacting. In one embodiment, a second interface 131, which occurs between the optical substrate 102 and the output coupler 103, includes a partially reflective coating. In one embodiment, this partially reflective coating comprises a multi-layer coating, which reflects a significant portion of s-polarized light while transmitting most of the p-polarized light. Light enters the output coupler 103 through the second interface 131 and, where used, the partially reflective coating. To further enhance the "see through transmission" of this interface, this partially reflective coating at the second interface 131 can be designed to have high transmission in the opposite polarization and high transmission in both polarizations at lower angles—referred to as "see through" angles. In one embodiment, the guiding angles—angles at which light propagating in optical substrate 102 encounters its top and bottom surfaces—are generally less than forty degrees.

One example of a partially reflective coating suitable for use in the second interface 131 is that of a multi-layer coating comprising an angle-selective reflector, a polarization-selective reflector, and a polarization rotator. Note that in some embodiments these layers may be incorporated in single layers. Incident light beams having a first polarization and a first angle are received by the coating. An angle-selective reflector in the coating partially reflects the received beam where the angle of incoming beam corresponds to the angle preference of the coating. Energy not reflected then passes through the reflector layer and is incident upon the polarization-selective reflector layer. The polarization-selective reflector layer then reflects a portion of the energy where the polarization of the received beam that has not already been reflected by the angle-selective reflector layer corresponds to the preferred polarization. The non-reflected portion of the beam continues through polarization-selective reflector layer and is rotated by the polarization rotator layer. This portion then continues as a transmitted beam.

As mentioned above, in one embodiment, the output coupler 103 comprises a series of partially reflective layers 118 that are configured to receive light from the optical substrate 102 and to direct the light away from the substrate guided relay 104. In so doing, the series of partially reflective layers 118 direct light toward a viewing region, which can either be a projection surface or, in some embodiments, a user's pupil. Where the viewing region is that of a user's eye, the luminous flux from the output coupler 103 containing light from all portions of the image can be characterized by an exit pupil. Where the exit pupil is sufficiently large as to cover the user's pupil, the user will be able to view images presented by the substrate guided relay 104 without vignetting. To observe an entire image at once, the exit pupil generally must be large enough to fill the user's pupil over the range of pupil positions required by a particular application.

The array of partially reflective layers 118 helps both to direct light away from the substrate guided relay 104 and to expand the exit pupil of the overall device. Note that while partially reflective coatings are used as the partially reflective layers 118 in one embodiment, it will be clear to those of ordinary skill in the art having the benefit of this disclosure that the invention is not so limited. Other devices, including diffractive elements or lenses, may also be used in conjunction with the output coupler 103.

Also as noted above, when the source delivering light to the substrate guided relay 104 is a compact light source, such as a scanned beam source that is desirable for near-to-eye optics due to its compact size and lightweight construction, the light beam 107 delivered by the light source 106 can be smaller in one or more dimensions than the light receiving surface 110 of the input coupler 101. In such scenarios, the brightness and uniformity of the displayed image 105 presented by the substrate guided relay 104 can suffer due to the small diameter of input light. In accordance with embodiments of the present invention, to produce output images of sufficient uniformity in brightness and clarity, a light homogenization relay device can be disposed between the substrate guided relay 104 and the light source 106. The light homogenization relay device is used to make one or more copies of the input beam 107. The copies create an effectively larger beam of light being delivered to the input coupler 101 while retaining the angular spread of the original input beam 107. The result is a more uniform display with a field of view consistent with a substrate guided relay using only a single input beam.

Figure 2:
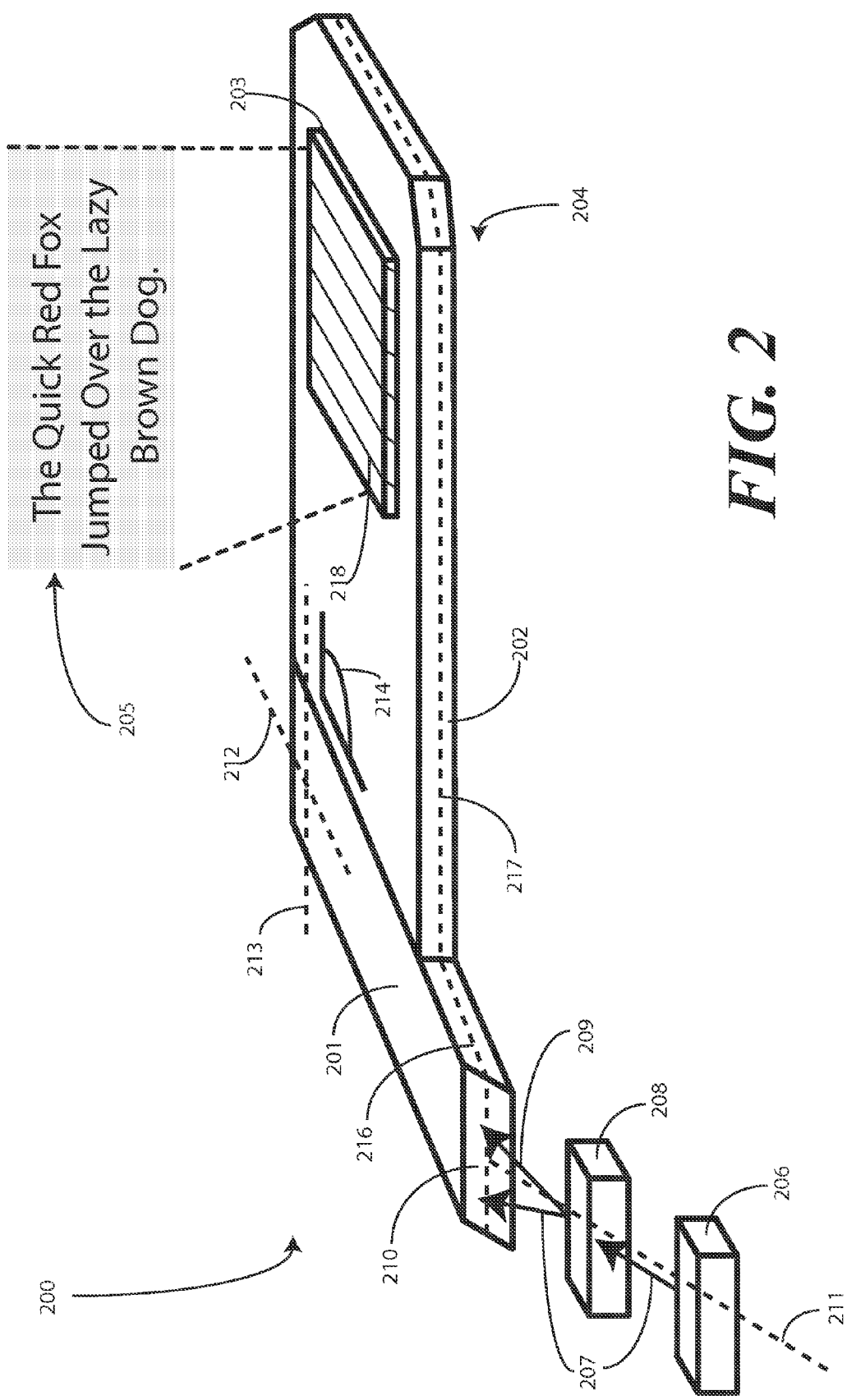
FIG. 2 illustrates one embodiment of an optical relay system employing a homogenizing relay device in accordance with embodiments of the invention.

Turning now to FIG. 2, illustrated therein is one embodiment of an optical relay system 200 comprising a light source 206 configured to emit a light beam 207 and a substrate guided relay 204 configured to transfer the light beam 107 across an optical substrate 202. In one embodiment, the light source 206 comprises a plurality of light sources and a MEMS scanning mirror. The optical relay system 200 of FIG. 2 includes a light homogenizing relay device 208 that is disposed between the light source 206 and the input coupler 201 of the substrate guided relay 204.

As with the substrate guided relay (104) of FIG. 1, the substrate guided relay 204 of FIG. 2 includes an input coupler 201, an optical substrate 202, and an output coupler 203. The input coupler 201 is coupled to the optical substrate 202. Similarly, the output coupler 203 is coupled to a major face of the optical substrate 202. The input coupler 201, the output coupler 203, and the optical substrate 202 can be coupled together in a variety of ways, including adhesives, glues, or optical contacting. In one embodiment, the interface between the input coupler 201 and the optical substrate 202 includes a partially reflective coating, such as a silver p-polarizing partially reflective coating. Similarly, the interface between the output coupler 203 and the optical substrate 202 can include a partially reflective coating, such as a multi-layer, s-polarized coating.

In one embodiment, the input coupler 201 and the optical substrate 202 are coupled together at an angle 214. This angle 214 occurs between the major axis 213 of the optical substrate 202 and the major axis 212 of the input coupler 201. Experimental testing has shown that angles of between 30 and 60 degrees, such as 45 degrees, work well in many applications. Note, however, that embodiments of the invention are not so limited. It will be clear to one of ordinary skill in the art having the benefit of this disclosure that other angles may also be used. For instance, angle 214 can be such that the major axis 213 of the optical substrate 202 and the major axis 212 of the input coupler 201 are orthogonal.

In the exemplary embodiment of FIG. 2, the output coupler 203 is disposed distally across the optical substrate 202 from the input coupler 201. The output coupler 203 is configured to receive light from the optical substrate 202 and direct the light away from the optical substrate 202 as an output image 205. In one embodiment, the output coupler 203 creates the output image 205 by way of one or more partially reflective surfaces 218 disposed within the output coupler 203. In one embodiment, the one or more partially reflective surfaces 218 comprise partially reflective coatings. In one embodiment, the input coupler 201 comprises a light receiving surface 210. The scanned light source 206 is disposed so as to provide a scanned light beam 207 to the light receiving surface 210. Note that the scanned light source 206 and the input coupler 201 can be integrated together, such that the light receiving surface 210 is disposed within the scanned light source 206. Alternatively, the scanned light source 206 and the input coupler 201 may be discrete components disposed along an optical axis.

In one embodiment, the light homogenizing relay device 208 is disposed between the scanned light source 206 and the input coupler 201 along an optical axis 211 running from the scanned light source 206 to the light receiving surface 210. When positioned in such a configuration, the light beam 207 emanating from the scanned light source 206 is first incident upon the light homogenizing relay device 208. The light homogenizing relay device 208 is configured to receive the light beam 207 from the scanned light source 206 and to make at least one copy of the light beam 207. The light homogenizing relay device 208 then delivers the light beam 207 and the at least one copy 209 to the substrate guided relay 204. While the light homogenizing relay device 208 can vary in shape and size, in one exemplary embodiment suitable for near to eye applications, the light homogenizing relay device 208 has a cross sectional area of between one and five millimeters by between one and five millimeters. One example has an input surface area of 2.5 millimeters by 2.0 millimeters.

In one embodiment, the light homogenizing relay device 208 delivers the light beam 207 and the at least one copy 209 to the light receiving surface 210 of the input coupler 201. Where the dimensions of the light beam 207 are smaller than that of the light receiving surface 210, making one or more copies of the light beam 207 helps to eliminate output image 205 mitigation occurring in the form of dim regions or gaps. The one or more copies of the light beam 207 create an effectively larger input beam incident upon the light receiving surface 210, while at the same time retaining the angular spread of the original beam. Hence, the field of view of the original beam is maintained.

Once the light beam 207 and the at least one copy 209 are delivered to the substrate guided relay 204, additional copies of the light can be made inside the substrate guided relay 204.

For example, in one embodiment, the input coupler 201 comprises a homogenization layer 216 disposed within the input coupler 201. One example of such a homogenization layer 216 is a partially reflective, s-polarizing partially reflective coating disposed within the input coupler 201 that runs the length of the input coupler 201 and is parallel to a major surface of the input coupler 201. As the light beam 207 and the at least one copy 209 propagate down the length of the input coupler 201, they periodically interact with the homogenization layer 216. When this occurs, components of the light beam 207 beam or the at least one copy 209 are reflected, while other components pass through the homogenization layer 216. When this occurs, additional copies are made.

Similarly, the optical substrate 202 may include a homogenization layer 217. One example of such a homogenization layer 217 is a partially reflective, s-polarizing partially reflective coating disposed within the optical substrate 202 that runs the length of the optical substrate 202 and is parallel to a major face of the optical substrate 202. As light passing from the input coupler 201 passes through to the optical substrate 202, and then passes along the length of the optical substrate 202, the light interacts with the homogenization layer 217. When this occurs, components of the light are reflected, while other components pass through the homogenization layer 217, thereby making additional copies of the light. Note that in some embodiments, both the input coupler 201 and optical substrate 202 include homogenization layers 216, 217. In other embodiments, neither includes a homogenization layer.

The output coupler 203 is configured to receive light from the optical substrate 202 and to direct the light away from the optical substrate 202 as an output image 205. In one embodiment, this is achieved with one or more partially reflecting surfaces 218. Note that the output coupler 203 can be coupled to the optical substrate 202 along either major face—top or bottom—of the optical substrate 202. As noted above, in one embodiment, a partially reflective coating, such as a 50% s-polarizing partially reflective interference layer coating, may be disposed between the output coupler 203 and the optical substrate 202.

Note also that the partially reflective coating disposed between the output coupler 203 and the optical substrate 202 can be designed so as to have a varying reflectance layer across its interface. For example, regions of the output coupler 203 disposed closer to the input coupler 201 may have an area of higher reflectivity (such as 60 percent), while regions of the output coupler 203 disposed more distally relative to the input coupler 201 may have an area of lower reflectivity (such as 40 percent). Further, the varied reflectivity surface may have discrete sections, or may continually vary, such as incrementally varying from a high reflectivity at area to a low reflectivity at area. Additionally, reflectivity may vary as a function of angle of incident light, polarization of incident light, wavelength of incident light, or any combination thereof. Varying the reflectivity/transmissivity provides—in some applications—for a different transmission of light beams from the optical substrate 202 to the output coupler 203. Note that variable reflectance, as described in relation to FIG. 1 above, can be useful in some applications between the input coupler 201 and the optical substrate 202 as well.

The one or more partially reflecting surfaces 218, where used, help to reflect light out of the substrate guided relay 204. In one embodiment, the one or more partially reflecting surfaces 218 are partially reflective so as to provide a visual image to a viewer while still permitting the viewer to see through the overall substrate guided relay 204. As such, a user employing the substrate guided relay 204 as a display apparatus in eyeglasses would be able to concurrently see both images afar and images presented by the substrate guided relay 204.

In one embodiment, the one or more partially reflecting surfaces 218 may be disposed substantially parallel with respect to one another. In some applications, the one or more partially reflecting surfaces 218 may have substantially similar partial reflection coatings creating a substantially uniform output coupler transmission so that ambient light passing through the output coupler 203 is substantially uniform. In other applications, one or more partially reflecting surfaces 218 may be spaced in such a way that ambient beams of light may pass through the output coupler 203 without impinging on any of the reflective surfaces. A viewer looking through such a substrate guided relay 204 may be less distracted by the reflective surfaces as some light beams reflected off objects outside the substrate guided relay 204 travel through the optical substrate 202 and output coupler 203 unimpeded. Additional details about the construction of suitable partially reflective surfaces may be found in application Ser. No. 11/603,964, entitled "Substrate-Guided Display with Improved Image Quality," filed Nov. 21, 2006 and incorporated by this reference in its entirety.

It can be advantageous to use the light homogenizing relay device 208 of the present invention because in some substrate guided relays can be difficult to create sufficient homogenization with partially reflective coatings disposed in two dimensions. This is true due to the differing polarization response of light interacting with multi-dimensional coating layers. For instance, one polarization, such as p-type polarization that occurs in the plane of incidence to a medium change, tends to pass through many partially reflective coatings due to the Brewster's angle effect. It can be very difficult to get even a small amount of p-polarized light to reflect from a non-metalized coating, even when many layers are used. Further compounding the problem, p-polarized partially reflective coatings tend to exhibit wide variations in reflectance as a function of wavelength and angle of incidence. For this reason, many p-polarizing partially reflective coatings do not homogenize light with sufficient effectiveness as to be used in near-to-eye substrate guided relay applications with scanned or other beam sources. Metal partially reflective coatings can be used to produce sufficiently good quality p-polarization coatings with desirable reflectance properties. However each time the light encounters these coatings a fraction (typically ten percent or more) of the light is absorbed. These losses can be acceptable if light does not encounter the surface a large number of times and/or if there are few of these types of coatings in a particular system. However, for homogenization of a small input source to obtain a large pupil, multiple p-polarization reflective surfaces are typically required. Further, light generally encounters each surface many times, thereby reducing the optical efficiency of the system.

Light that is s-polarized is generally easier to homogenize with partially reflective coatings. S-polarized light can be reflected with a partially reflective coating deposited along an interface having only a few layers. Further, s-polarizing partially reflective coatings are often less expensive than are the p-polarizing counterparts. Further, s-polarizing partially reflective coatings generally provide better performance across wavelength and angle than do p-polarizing partially reflective coatings. Embodiments of the present invention take advantage of these characteristics and provide a high degree of homogenization in two directions by duplicating the incoming beam of light prior to it reaching the input coupler 201. The "multi-directional" homogenization provided by embodiments of the invention described herein makes it possible to construct substrate guided relays that are smaller and cheaper to manufacture. Further, embodiments of the present invention have better brightness and color uniformity, yet have larger fields of view and exit pupils than do conventional substrate guided relays. Note that coatings, in general, whether s-polarizing or p-polarizing, will reflect some component of the s-polarized light and some component of the p-polarized light and transmit some of each component as well.

Figure 3:
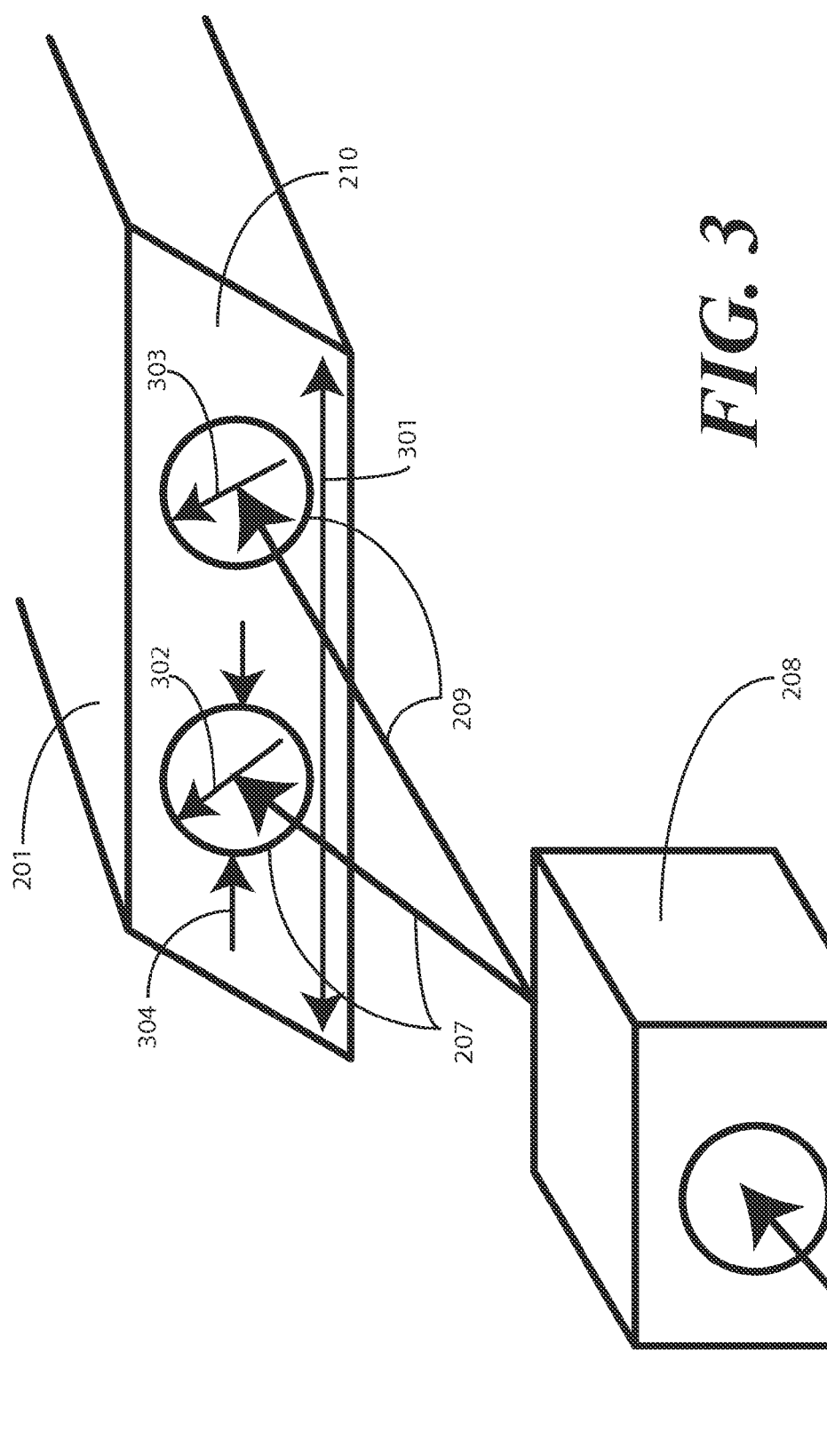
FIG. 3 illustrates a light receiving surface collecting light from a homogenizing relay device in accordance with embodiments of the invention.

Turning now to FIG. 3. Illustrated therein is an enlarged view of the light homogenizing relay device 208 and the input coupler 201 from FIG. 2. In FIG. 3, the light receiving surface 210, as well as the light beam 207 and at least one copy 209 incident upon the light receiving surface 210, can be more readily seen.

Beginning with the light receiving surface 210, in FIG. 3 the width 301 of the light receiving surface 210 can be seen. Similarly, the light receiving surface 210 has a height associated therewith. When a scanned light source (206) is used, such as one using a MEMS scanning mirror, it is sometimes the case that a dimension 304 of the light beam 207 is smaller than a dimension, e.g., width 301, of the light receiving surface 210. It is in these situations that a copy 209 of the light beam 207 created by the light homogenizing relay device 208 can be beneficial. As the copy 209 is a replication of the light beam 207, it too will have a dimension 303 that is smaller than dimensions of the light receiving surface 210. However, the copies of light create an effectively larger light beam that is incident upon the light receiving surface 210. Note that the copies of light can overlap on 210 as well.

At the same time, in many applications the light beam 207 will be a complex image array with color and image detail. The light beam has an angular spectrum, represented by reference designator 302 in FIG. 3, associated therewith. When devices replicate light without retaining this angular spectrum, the resulting image can be distorted unless additional compensation is provided. Embodiments of the present invention work to retain the angular spectrum of the light beam 207 in the copy 209. The angular spectrum of the light beam 207 is retained in as an angular spectrum—represented by reference designator 303—in the copy 209. As such, the field of view seen by the user remains uncompromised.

The light homogenizing relay device 208 can take many forms. Said differently, there are many physical devices and configurations of light homogenizing relay devices that can achieve the task of replicating an incoming light beam 207 while retaining the angular spread of that beam. FIGS. 4-8 explore some embodiments of light homogenizing relay devices. These embodiments are intended to be exemplary only, as other light homogenizing relay devices will be clear those of ordinary skill in the art having the benefit of this disclosure.

Figure 4:
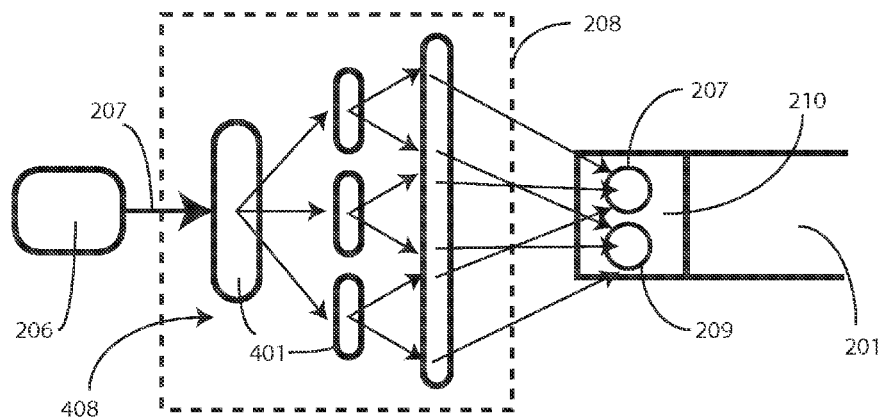
FIG. 4 illustrates one embodiment of a homogenizing relay device in accordance with the invention.

Turning now to FIG. 4, illustrated therein is one exemplary embodiment of a light homogenizing relay device 208 in accordance with various embodiments of the invention. In FIG. 4, the light homogenizing relay device 208 is that of a pupil expander 408. The illustrative pupil expander 408 of FIG. 4 comprises a multi-lens array. As shown by the light ray diagramming, the lenses 401 of the multi-lens array of FIG. 4 work to create at least one copy 209 of a light beam 207 emanating from a scanned light source 206. The light beam 207 and at least one copy 209 are delivered to the light receiving surface 210 of the input coupler 201 by the light homogenizing relay device 208.

Figure 5:
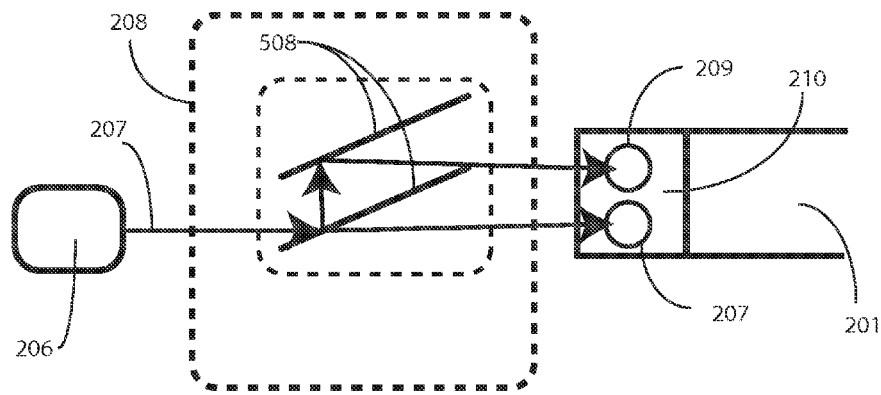
FIG. 5 illustrates one embodiment of a homogenizing relay device in accordance with the invention.

Turning now to FIG. 5, illustrated therein is another exemplary embodiment of a light homogenizing relay device 208 in accordance with embodiments of the invention. In FIG. 5, the light homogenizing relay device 208 comprises one or more partially reflective plates 508. Partially reflective plates, as are known in the art, are devices that reflect some incident light and pass some incident light therethrough. For example, some partially reflecting plates include one or more layers of partially reflective coatings, such as s-polarizing partially reflective coatings.

As shown by the light ray diagramming, the partially reflecting plates 508 of FIG. 5 work to create at least one copy 209 of a light beam 207 emanating from a scanned light source 206. The light beam 207 and at least one copy 209 are delivered to the light receiving surface 210 of the input coupler 201 by the light homogenizing relay device 208.

Note that an equivalent of one or more partially reflecting plates is to have a single optical element, such as a glass or fused silica device, that includes one or more partially reflective layers disposed therein. These partially reflective layers operate much in the same way as the partially reflective plates, in that they create at least one copy 209 of the incoming light beam 207 for delivery to the light receiving surface 210 of the input coupler 201.

Figure 6:
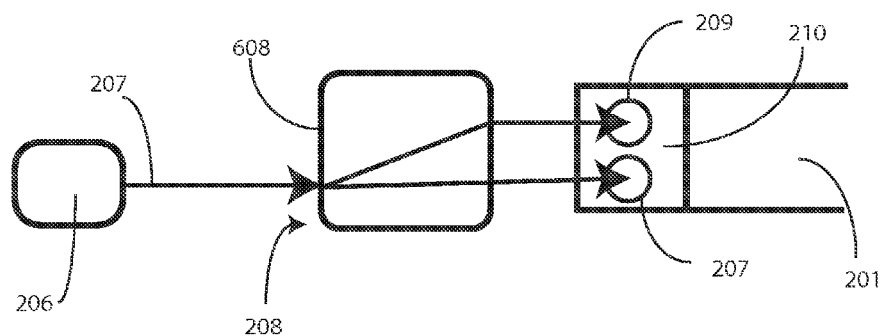
FIG. 6 illustrates one embodiment of a homogenizing relay device in accordance with the invention.

Turning now to FIG. 6, illustrated therein is another exemplary embodiment of a light homogenizing relay device 208 in accordance with embodiments of the invention. In FIG. 6, the light homogenizing relay device 208 comprises a birefringent crystal 608. Birefringent crystals, as are known in the art, are devices that decompose the incident light beam 207 into multiple rays, thereby creating at least one copy 209 of the light beam 207. Examples of birefringent crystals include calcite crystals, boron nitride crystals, and other materials.

As shown by the light ray diagramming, the birefringent crystal 608 of FIG. 6 works to create at least one copy 209 of a light beam 207 emanating from a scanned light source 206. The light beam 207 and at least one copy 209 are delivered to the light receiving surface 210 of the input coupler 201 by the light homogenizing relay device 208.

Figure 7:
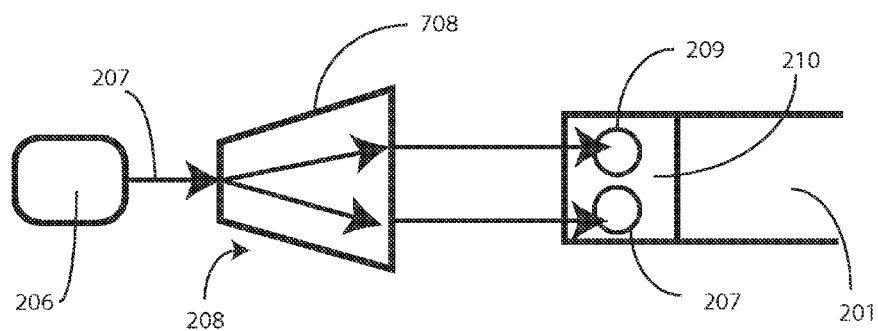
FIG. 7 illustrates one embodiment of a homogenizing relay device in accordance with the invention.

Turning now to FIG. 7, illustrated therein is another exemplary embodiment of a light homogenizing relay device 208 in accordance with embodiments of the invention. In FIG. 7, the light homogenizing relay device 208 comprises a prism 708. Prisms are well known the art, and in this application create at least one copy 209 of the light beam 207. As shown by the light ray diagramming, the prism 708 of FIG. 7 works to create at least one copy 209 of a light beam 207 emanating from a scanned light source 206. The light beam 207 and at least one copy 209 are delivered to the light receiving surface 210 of the input coupler 201 by the light homogenizing relay device 208.

Figure 8:
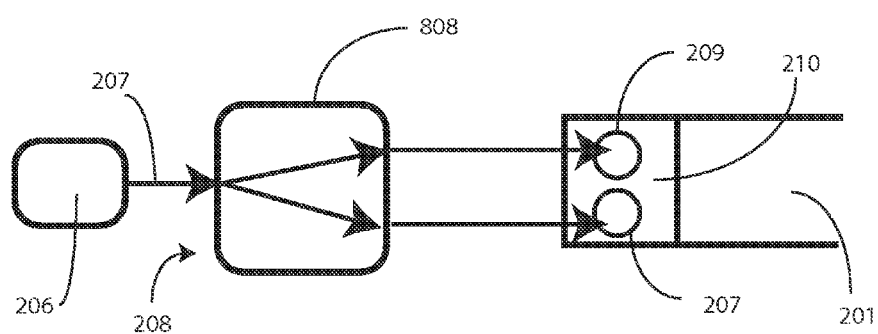
FIG. 8 illustrates one embodiment of a homogenizing relay device in accordance with the invention.

Turning now to FIG. 8, illustrated therein is yet another exemplary embodiment of a light homogenizing relay device 208 in accordance with embodiments of the invention. In FIG. 8, the light homogenizing relay device 208 comprises a plurality of diffractive elements, shown generally as diffractive element 808. As shown by the light ray diagramming, the diffractive elements 808 of FIG. 8 work to create at least one copy 209 of a light beam 207 emanating from a scanned light source 206. The light beam 207 and at least one copy 209 are delivered to the light receiving surface 210 of the input coupler 201 by the light homogenizing relay device 208.

FIGS. 4-8 have shown various exemplary devices that function as a light homogenizing relay device 208. Note that combinations of these devices may also be used. To increase the amount of homogenization being applied to the light beam 207, a designer may elect to use multiple light homogenizing relay devices. As such, any combination of pupil expanders (408), multi-lens arrays, partially reflective plates (508), birefringent crystals (608), optical elements including partially reflective layers, or diffractive elements (808) can be used as the light homogenizing relay device 208.

Figure 9:
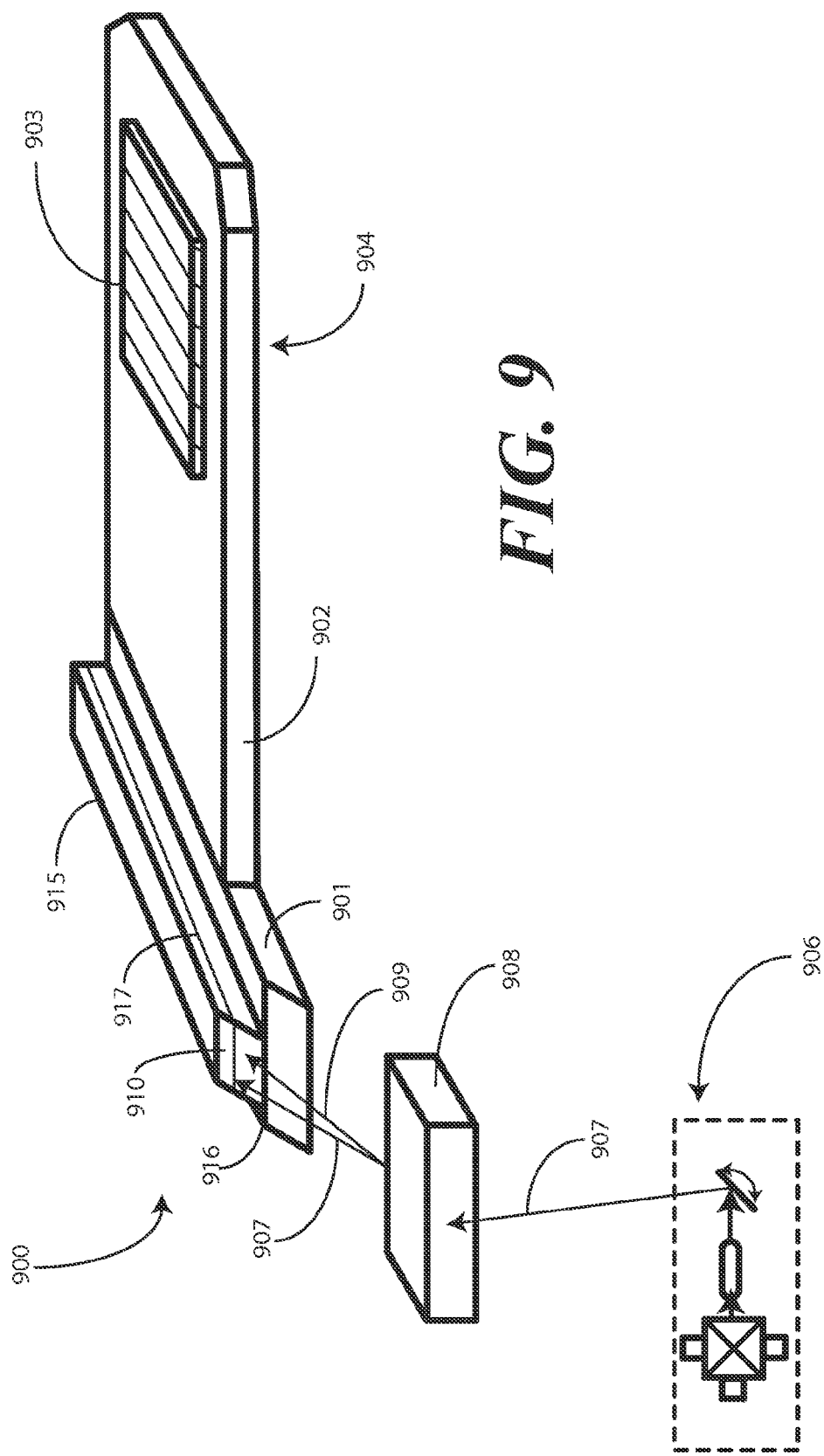
FIG. 9 illustrates one embodiment of an optical relay system employing a homogenizing relay device in accordance with embodiments of the invention.

Turning now to FIG. 9, illustrated therein is an alternate optical relay system 900 in accordance with embodiments of the invention. In FIG. 9, the substrate guided relay includes four components: an input coupler 901, an optical substrate 902, an output coupler 903, and a light homogenizing layer 915. The light homogenizing layer 915 is coupled to the input coupler 901 in an offset location such that a major face of the light homogenizing layer 915 is offset relative to a major face of the input coupler 901 along their interface 916. Note that this offset amount can be to either side of the center of the input coupler 901, and can vary from a very small amount (tenths of millimeters) to nearly the width of the input coupler 901.

In one embodiment, the light homogenizing layer 915 includes at least one partially reflective coating layer 917 disposed therein. The partially reflective coating layer 917, in one embodiment, is disposed substantially parallel to the interface 916 between the light homogenizing layer 915 and the input coupler 901. When a light source, such as a light beam 907 and the at least one copy 909 coming from the scanned light source 906 through the light homogenizing relay device 908, is incident upon the light receiving surface 910 of the light homogenizing layer 915, this light begins to propagate down the light homogenizing layer 915. As it does, this light intersects the partially reflective coating layer 917. One component of the light reflects off the partially reflective coating layer 917, and another passes through. As such, additional copies of this light are made. This process continues as the light traverses down the light homogenizing layer 915. In one embodiment, the partially reflective coating layer comprises an s-polarizing multi-layer coating. However, p-polarizing partially reflective coatings may also be used.

One advantage of the embodiment of FIG. 9 is the fact that expensive p-polarizing partially reflective coatings can be reduced or eliminated from the design of the input devices. As the light homogenizing layer 915 is offset from the input coupler 901, p-polarized copies are made when the light intersects the edges of the input coupler 901. As such, one need only use s-polarizing partially reflective coatings as the partially reflective coating layers to obtain additional homogenization.

Another advantage of the embodiment of FIG. 9 is that a single layer optical substrate 902 can be used. As the stacked light homogenizing layer 915 and light homogenizing relay device 908 create a high degree of homogenization, in one embodiment the optical substrate 902 can be a single layer optical substrate with no additional partially reflective surfaces required therein. As such, the optical substrate can be fabricated as a much thinner device than can prior art optical substrates. For this reason, the embodiment of FIG. 9, as are the other embodiments illustrated and described herein, is well suited for near-to-eye applications, including eyeglass-mounted displays.

One additional advantage of a single layer optical substrate is the fact that the single layer, devoid of homogenization layers, offers a higher light transmission factor than do some other substrates. This works to eliminate interference fringes that can occur in the output. Further, the overall thickness of the single layer substrate can be cut in half relative to some other multilayer substrates. Finally, the optical output device design can be simplified when a single layer optical substrate is used.

Embodiments of the present invention offer a thin, compact form factor that may be incorporated into lightweight devices such as eyeglasses, helmet shields, or other display devices. Such display devices may be transparent or non-transparent. Other devices, such as mobile communication devices may also employ the relays.

Figure 10:
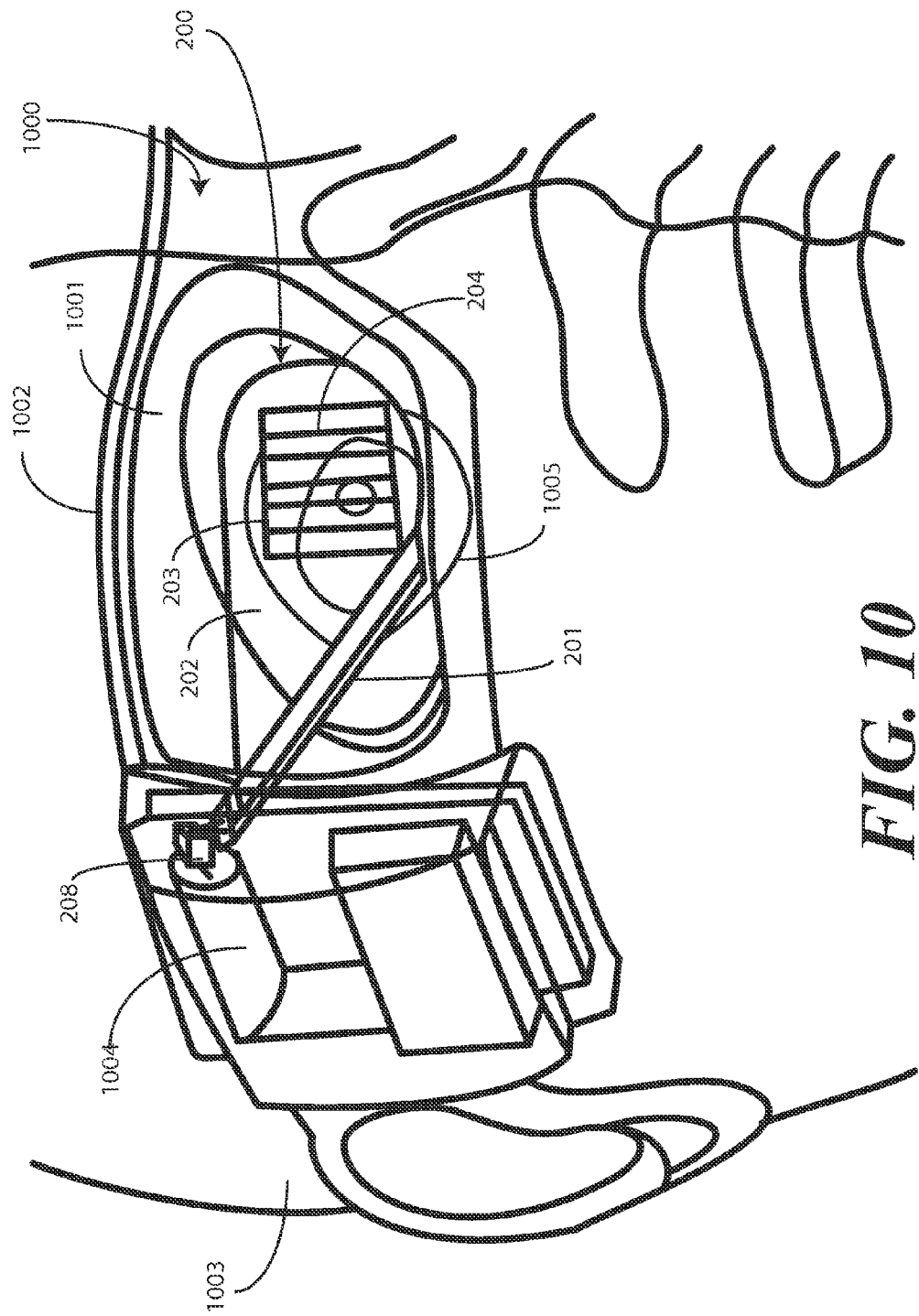
FIG. 10 illustrates one embodiment of an eyewear device employing an optical relay system in accordance with embodiments of the invention.

Turning now to FIG. 10, illustrated therein is one embodiment of an eyewear device 1000 using a substrate guided relay 204 in accordance with embodiments of the invention. The eyewear device 1000 is configured to present visible images to the wearer 1003 by projecting those images into the wearer's eye 1005. The eyewear device 1000 includes lens assemblies 1001 that are coupled to a frame 1002. In one embodiment, one of the lens assemblies 1001 has integrated therewith a substrate guided relay 204 configured in accordance with embodiments of the invention.

The substrate guided relay 204 includes an input coupler, an optical substrate 202, and an output coupler 203. Light is delivered to the input coupler 901 by an image-producing source 1004, such as a scanned beam source. This light first passes through a light homogenizing relay device 208, which is integrated within the eyewear device 1000. The light homogenizing relay device 208, in one embodiment, is disposed between the image-producing source 1004 and the input coupler 201.

In one embodiment, the light homogenizing relay device 208 is configured to receive a beam of light from the image-producing source 1004, and to make at least one copy of the beam of light. The beam and the copy are then delivered to the input coupler 201 of the substrate guided relay 204. The input coupler can optionally include a light homogenization layer, as was described in FIG. 9.

The output coupler 203 is coupled to a major face of the optical substrate 202. The output coupler 203 is configured to receive the light and various copies from the optical substrate 202. The output coupler 203 then delivers the light and its copies to the user's pupil with the assistance of one or more partially reflective surfaces disposed within the output coupler 203. In one embodiment, the eyewear device 1000 (as well as the substrate guided relay 204) is configured such that the wearer can see images beyond the lens assemblies 1001 while the image-producing source 1004 is active.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical relay system, comprising:
a light source configured to emit a light beam;
a substrate guided relay, wherein the substrate guided relay comprises an input coupler, an optical substrate coupled to the input coupler, and an output coupler coupled to the optical substrate; and a light homogenizing relay device disposed between the light source and the substrate guided relay, wherein the light homogenizing relay device is configured to receive the light beam from the light source, to make at least one copy of the light beam outside the substrate guided relay, and to deliver the light beam and the at least one copy of the light beam to the substrate guided relay, wherein the light beam has an angular spread associated therewith, wherein the at least one copy of the light beam retains the angular spread associated with the light beam so as to retain an original field of view between the light beam and the at least one copy of the light beam.

2. The optical relay system of claim 1, wherein the input coupler comprises a light receiving surface, wherein the light homogenizing relay device is disposed along an optical axis running from the light source to the light receiving surface.

3. The optical relay system of claim 2, wherein the light source comprises a scanned light source, further wherein the light beam is smaller than the light receiving surface along at least one dimension.

4. The optical relay system of claim 2, wherein the light homogenizing relay device is disposed so as to deliver the light beam and the at least one copy to the light receiving surface of the input coupler.

5. The optical relay system of claim 1, wherein the light homogenizing relay device comprises two or more elements selected from the group consisting of pupil expanders, multi-lens arrays, partially reflective plates, birefringent crystals, optical elements having one or more partially reflective layers disposed therein, prisms, diffractive elements, and combinations thereof.

6. The optical relay system of claim 1, further comprising a light homogenizing layer coupled to the input coupler in an offset configuration, wherein the light homogenizing relay device is disposed so as to deliver the light beam and the at least one copy of the light beam to the light homogenizing layer.

7. The optical relay system of claim 1, wherein one of the input coupler, the optical substrate, or both, comprise at least one partially reflective homogenization layer disposed therein.

8. The optical relay system of claim 1, wherein the output coupler comprises one or more partially reflective surfaces disposed within the output coupler.

9. The optical relay system of claim 1, wherein the light source comprises a plurality of light sources and at least one MEMS scanning mirror.

* * * * *

UNITED STATES PATENT AND TRADEMARK OFFICE
CERTIFICATE OF CORRECTION

| | | |
|---|---|---|
| PATENT NO. | : 7,613,373 B1 | Page 1 of 1 |
| APPLICATION NO. | : 12/167882 | |
| DATED | : November 3, 2009 | |
| INVENTOR(S) | : Christian Dean DeJong | |

It is certified that error appears in the above-identified patent and that said Letters Patent is hereby corrected as shown below:

In the Specification:

Column 1, Line 3:

Add the following Government Rights Statement after the title and before the Background Section:

STATEMENT REGARDING FEDERALLY SPONSORED RESEARCH OR DEVELOPMENT

This invention was made with government support under Contract Number FA8650-06-C-6724 awarded by the U.S. Air Force. The government has certain rights in the invention.

Signed and Sealed this
Eighth Day of October, 2013

Teresa Stanek Rea
*Deputy Director of the United States Patent and Trademark Office*